UNITED STATES PATENT OFFICE.

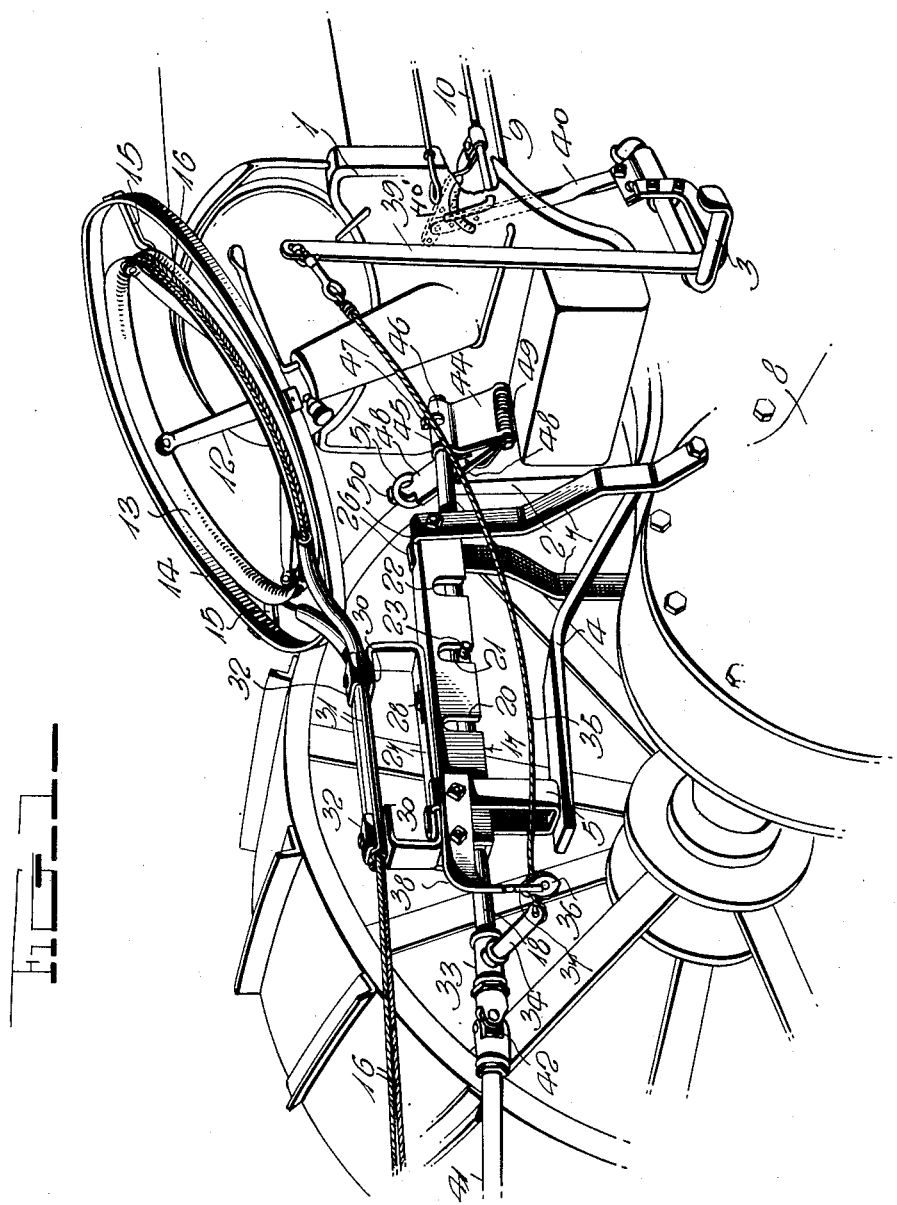

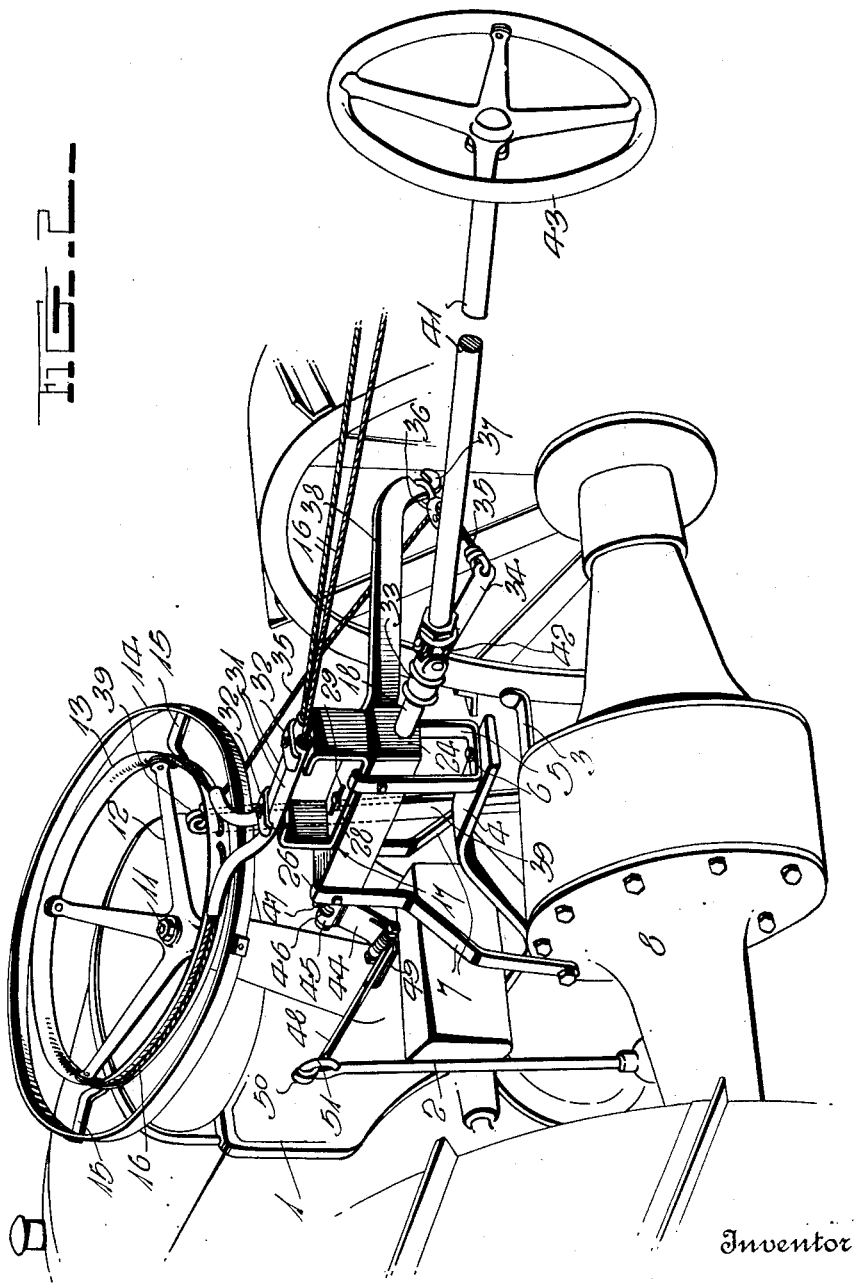

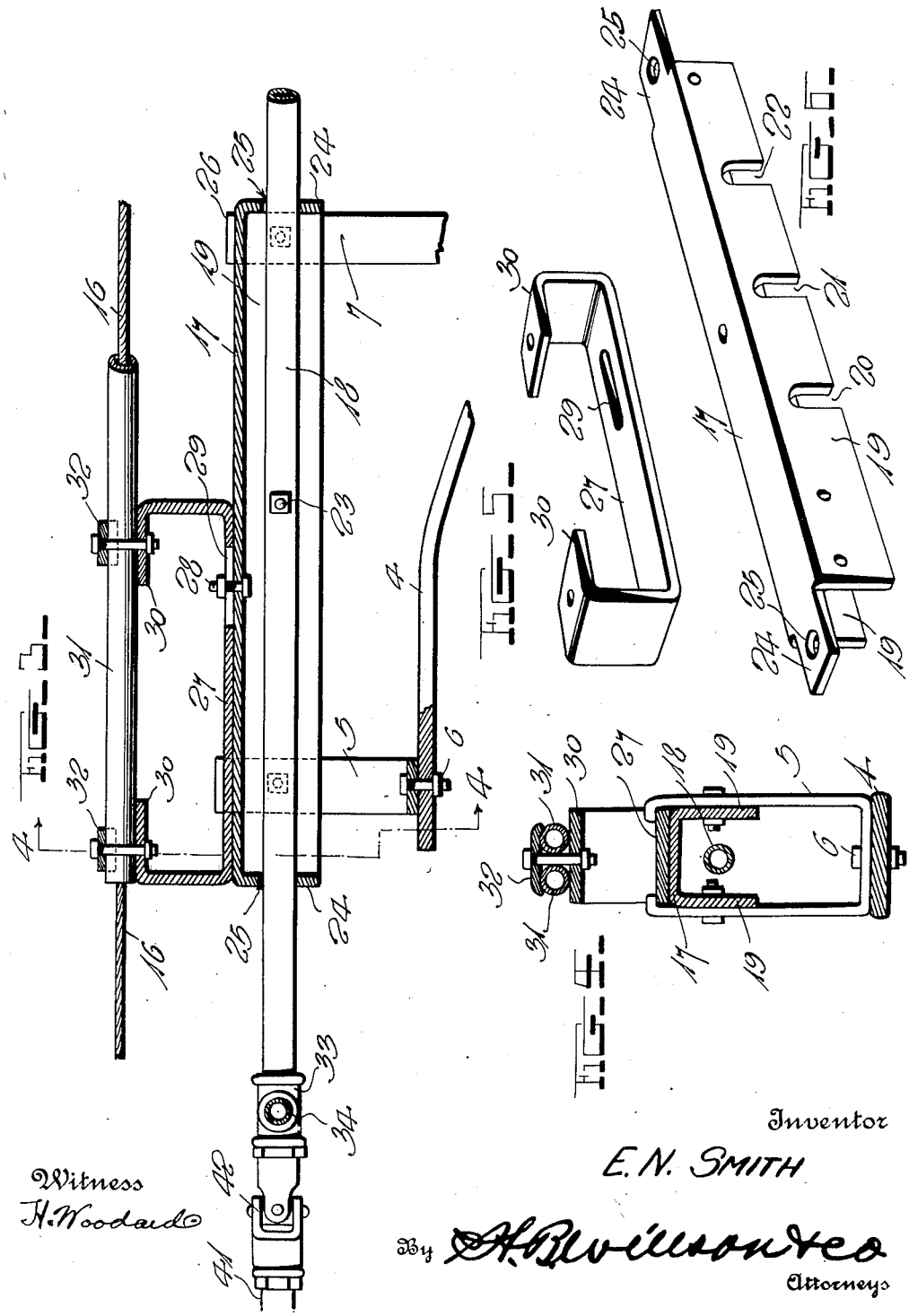

ERIC N. SMITH, OF HOYTVILLE, OHIO, ASSIGNOR OF ONE-HALF TO HERBERT H. DILLINGER, OF HOYTVILLE, OHIO.

CONTROLLING DEVICE FOR TRACTORS.

1,408,231.     Specification of Letters Patent.     Patented Feb. 28, 1922.

Application filed February 21, 1921. Serial No. 446,815.

*To all whom it may concern:*

Be it known that I, ERIC N. SMITH, a citizen of the United States, residing at Hoytville, in the county of Wood and State of Ohio, have invented certain new and useful Improvements in Controlling Devices for Tractors; and I do declare the following to be a full, clear, and exact description of the invention, such as will enable others skilled in the art to which it appertains, to make and use the same.

This invention relates to an improved controlling device for tractors and one object of the invention is to provide a device so constructed that the gears may be shifted and the clutch thrown into and out of an operative position by means of a shaft extending rearwardly to the implement or vehicle being drawn across a field by means of the tractor.

Another object of the invention is to provide improved means for slidably and rotatably mounting the shaft and for releasably holding the shaft in an adjusted position, means being further provided for connecting the shaft with a lever carried by the clutch pedals of the tractor so that the clutch may be released while the gears are being shifted.

Another object of the invention is to so construct this device that it may be mounted upon the tractor and supported from the differential housing and from the spring ordinarily carrying the seat of a tractor.

Another object of the invention is to so construct this device that it may be connected with a conventional gear shifting lever, the element of the attachment which engages the gear shifting lever being so constructed and mounted that it will be prevented from accidentally slipping out of engagement with the gear shifting lever.

Another object of the invention is to so construct this device that it may be formed principally of sheet metal with the exception of the shaft.

Another object of the invention is to so construct this device that guides for steering lines may be carried by the housing for slidably and rotatably mounting the shaft, the lines pasing through the guides being carried about a drum having a construction somewhat similar to an ordinary steering wheel and mounted upon the steering shaft of the tractor.

Another object of the invention is to so construct this device that movement may be imparted to the spark and gasoline control rods and the speed of the motor thus regulated while shifting.

This invention is illustrated in the accompanying drawings, wherein:

Figure 1 is a perspective view showing a portion of a tractor with the improved attachment in place.

Figure 2 is a view similar to Fig. 1 looking from the opposite side of the tractor.

Figure 3 is an enlarged longitudinal sectional view through the housing rotatably and slidably mounting the shaft of this attachment.

Figure 4 is a vertical sectional view taken along the line 4—4 of Fig. 3.

Figure 5 is a perspective view of the brackets carried by the housing and serving to support the line guides.

Figure 6 is a perspective view of the housing before the tongues at the ends of the housing are bent down to form the ends or heads of the housing.

This improved tractor controlling device is shown in connection with a tractor indicated in general by the numeral 1 and having a conventional construction. It includes a gear shifting lever 2 and clutch control pedal 3 and further carries a spring strip 4 upon which the driver's seat is usually mounted. The driver's seat however has been removed and a U-shaped supporting yoke 5 put in place and secured by a bolt 6 which will pass through the opening through which the usual bolt is passed for connecting a seat with the spring support 4. Supporting strips or legs 7 are provided and have their lower ends connected with the differential housing 8 by two of the bolts which serve to hold the heads of the differential housing in place. The tractor is further provided with the usual spark and fuel control rods 9 and 10 and is further provided with an ordinary steering shaft 11 upon which a conventional steering wheel is ordinarily mounted. In this case, the ordinary steering wheel has been removed and in place thereof there has been provided a spider 12 having a grooved rim 13 connected therewith and forming a drum. An outer rim 14 is placed about the rim 13 and connected therewith by arms 15 so that there will be no danger of the cable which forms the line 16 slipping off of the rim 13.

The housing 17 in which the shaft 18 is slidably and rotatably mounted is formed from heavy sheet metal and is provided with depending side walls 19, one of which is provided with slots 20, 21 and 22, adapted to receive a pin 23 which is carried by the shaft 18. End tongues are carried by the housing and bent down to provide end walls 24, the end walls or heads 24 having openings 25 formed therein so that the shaft 18 may have sliding movement longitudinally through the housing with its end portions extending beyond the ends of the housing. The arms of the U-shaped yoke 5 are connected with the side walls of the housing 17 and the upper end portions of the supporting legs 7 are connected with the housing so that this housing will be supported as shown in Figs. 1 and 2. It should be noted that the upper ends of the supporting legs 7 are bent over to engage the upper wall of the housing as shown at 26 and that the upper end portions of the arms of the yoke 5 are bent inwardly to engage a bracket 27 which rests upon the housing 17 and is slidably connected therewith by means of a bolt or other similar fastener 28 which passes through a slot 29 formed in the bracket. The bracket 27 is provided with arms which extend upwardly and have their upper end portions bent inwardly thus providing supporting heads 30 upon which rest the pipes 31 through which the lines 16 pass. These pipes are held in place by clamps 32. It will thus be seen that by adjustment of the supporting bracket, the forward end portions of the pipes 31 may be brought into close engagement with the grooved rim 13 and thus danger of the cable or line 16 slipping off of the grooved rim or drum is reduced to a minimum.

The shaft 18 extends through the housing and at its rear end carries a coupling 33 from which extends an arm 34 connected with a line 35 which passes through a pulley 36 suspended from the hook 37 at the end of the supporting strip 38 which is secured to the housing as shown in Fig. 1. This line 35 extends forwardly as shown and is connected with the upper end of the lever 39 which lever is substantially L-shaped and has its lower end portion connected with the shank of the pedal 3. It will thus be seen that when the lever is drawn rearwardly, the pedal will be depressed in the usual manner when throwing the clutch out of operation. A strip 40 is connected with the shank of this pedal 3 as shown in Fig. 3 and will be connected with an arm 40' on the fuel control rod 10 so that when the clutch is thrown out of an operative position, the speed of the motor will be cut down and thus the motor prevented from racing while the gears are being shifted. The rear section 41 of the drive shaft is connected with the forward section 18 thereof by a universal joint 42 and this rear section carries a conventional steering wheel 43. This rear section of the steering shaft will be of a suitable length and if desired may be formed in a plurality of sections connected by suitable couplings. The forward end of the shaft 18 carries a plate 44 which is loosely mounted for rotary movement upon the shaft, the plate being provided with a sleeve 45 through which the shaft passes and the sleeve having a slot 46 formed therein through which passes a setscrew 47 so that the shaft may have a certain amount of rotary movement independently of the plate 44. An elongated plate or strip 48 is hingedly connected with the plate 44 and engaged by a spring 49 so that this strip 48 will be normally swung upwardly to retain its hook-shaped tongue 50 in the eye 51 of the free end of the gear shifting lever 2. By providing this reduced and hook-shaped tongue, the lever 2 may be drawn inwardly by engagement of the lever through the medium of the hook at the end of the tongue and the lever may be moved outwardly by engagement of the eye by the shoulders at the opposite sides of the inner end of this tongue. It will thus be seen that the lever may be swung transversely of the tractor when the shaft is rotated and may be swung longitudinally of the tractor when the shaft is moved longitudinally.

When the machine is to be provided with the improved attachment, the ordinary steering wheel will be removed and the seat removed. The yoke 5 will be connected with the support 4 and the supporting legs 7 connected with the differential housing as shown and the lever 39 will be connected with the treadle 3. The plate or strip 40 will be mounted as shown and the plate or strip 48 connected with the eyes at the upper end of the gear shifting lever. The steering shaft extends rearwardly of the machine to a convenient point where it can be easily reached by the operator who will occupy the usual place provided for the driver of the wagon or agricultural implement which is being drawn across the field by means of a tractor. When the gears are in intermediate position, the pin 23 will be positioned in the intermediate slot 21. If it is desired to shift the gears to cause the tractor to move rearwardly or to cause the tractor to move forwardly at first, second or third speeds, the shaft will first turn to move the pin out of the slot 21 and the shaft will then be moved longitudinally. In this manner, it will be noted that the gear shifting lever will be moved in the customary manner when shifting gears. When the shaft is rotated to permit shifting of the gears, the arms 34 draws upon the line or cable 35 and the lever 39 will be swung to depress the foot treadle 3 thus drawing up the clutch. The shifting can thus be accomplished with the clutch out of operation. After the desired shifting of gears has been accomplished, the shaft will be rotated to return the pin to a position in which the pin will extend through one of the slots 20, 21 or 22 according to the position of the shaft in the housing. When the treadle is pressed downwardly to throw out the clutch, the plate or strip 40 also moves and the motor will be cut down in speed and thus prevented from racing. It will thus be seen that this device is so constructed that the clutch can be thrown out of an operative position, the speed of the motor cut down and the gears shifted through the medium of a single shaft. It will be further noted that the tractor can be steered from the agricultural implement through the medium of the line 16 and that therefore it is not necessary for a driver to ride upon the tractor.

I claim:

1. A control attachment for a tractor comprising a housing extending longitudinally of the tractor and having a side wall provided with slots, a shaft extending longitudinally through the housing and slidably and rotatably mounted, a pin carried by said shaft for entering said slots and releasably holding the shaft against longitudinal movement, a lever adapted for connection with a clutch pedal, an arm extending transversely from said shaft, a guide supported to one side of said housing, a line connected with said arm and lever and engaged by said guide, a carrier mounted upon said shaft and having limited rotary movement thereon, a strip pivotally carried by said carrier and having a reduced tongue extension at its free end for engaging a gear shifting lever, resilient means yieldably holding said strip in a raised position, and means for actuating a fuel control rod adapted for connection with the clutch pedal.

2. A controlling attachment for a tractor comprising a shaft, means mounting said shaft for rotary movement and longitudinal sliding movement, a side arm extending from said shaft, a lever adapted for connection with a clutch actuating treadle, a line connecting said side arm with said lever, means for actuating a fuel control rod adapted for connection with the clutch shifting treadle, and means for imparting movement to a gear shifting lever including an inner member loosely mounted upon said shaft for limiting rotary movement thereon, an outer member hingedly connected with the inner member and adapted for releasably engaging a gear shifting lever, and resilient means yieldably holding the outer section in a raised position.

3. A controlling mechanism for a tractor comprising an actuating shaft rotatably and slidably mounted, a lever adapted for connection with a clutch treadle, a side arm extending from said shaft, flexible connections between said lever and side arm, and means for actuating the gear shifting lever comprising an inner member loosely mounted upon said shaft for limiting rotary movement thereon and an outer member movably connected with the inner member and adapted for engagement with the gear shifting lever.

4. A conrtolling device for a tractor comprising a shaft, a housing having a shaft extending longitudinally through the same and slidably and rotatably mounting the shaft, a support for one end of said housing adapted for connection with the seat support of a tractor, supporting means for the forward end portion of the housing adapted for connection with the differential housing of the tractor, a supporting arm extending from said housing and extending to one side thereof, a guide carried by said supporting arm, a lever arm extending from said shaft, a lever adapted for connection with a clutch treadle, a line connected with the lever and lever arm and engaged by said guide, means for actuating a fuel control rod adapted for connection with a clutch treadle, a plate loosely mounted upon the forward end portion of said shaft and having a slot extending partially about said shaft, a set-screw carried by the shaft and extending through the slot to limit swinging movement of the plate upon said shaft, a strip hingedly connected with said plate and having at its free end a reduced tongue for extending through an eye in the upper end of a gear shifting lever, and a spring engaging said strip for yieldably holding the strip in a raised position.

5. A controlling device for a tractor comprising a housing having side walls and end walls, a shaft passing through openings in the end walls and rotatable and slidable longitudinally of the housing, one of the side walls having slots formed therein at points throughout its length, a pin extending from said shaft for entering a selected slot to releasably hold the shaft against longitudinal sliding movement, supporting means for the forward and rear end portions of said housing, a supporting arm carried by said housing, a lever arm extending from said shaft, a guide carried by said supporting arm, a bracket slidably mounted upon said housing for movement longitudinally thereof, tubular means carried by said bracket for receiving guiding lines adapted for connection with the steering wheel of a tractor, a lever adapted for connection with the clutch treadle of a tractor, a flexible connection between said lever and said lever arm, means carried by the forward end portion of said shaft for engaging a gear shifting lever of the tractor, and means for actuating a fuel control rod adapted for connection with the clutch treadle of the tractor.

6. A controlling device for a tractor comprising a housing, a shaft rotatable in the housing and slidable longitudinally thereof and extending beyond the ends of the housing, means carried by the forward end portion of the shaft for connection with a gear shifting lever of a tractor, said means being loosely mounted upon the shaft and limited in its movement thereon, a lever adapted for connection with a clutch treadle of a tractor, a side arm extending from said shaft, a flexible connection between said lever and side arm for imparting movement to the lever and depressing the treadle when the shaft is rotated in the housing, and means for actuating a fuel control rod of a tractor adapted for connection with the clutch treadle of the tractor.

7. A controlling device for a tractor including a lever adapted for connection with the clutch treadle of a tractor, means for imparting movement to the fuel control rod of a tractor adapted for connection with the treadle, operating means including a shaft slidably and rotatably mounted, a connection between said lever and said operating means, and means carried by the operating means for engaging the gear shifting lever of a tractor.

In testimony whereof I have hereunto set my hand.

ERIC N. SMITH.